UNITED STATES PATENT OFFICE.

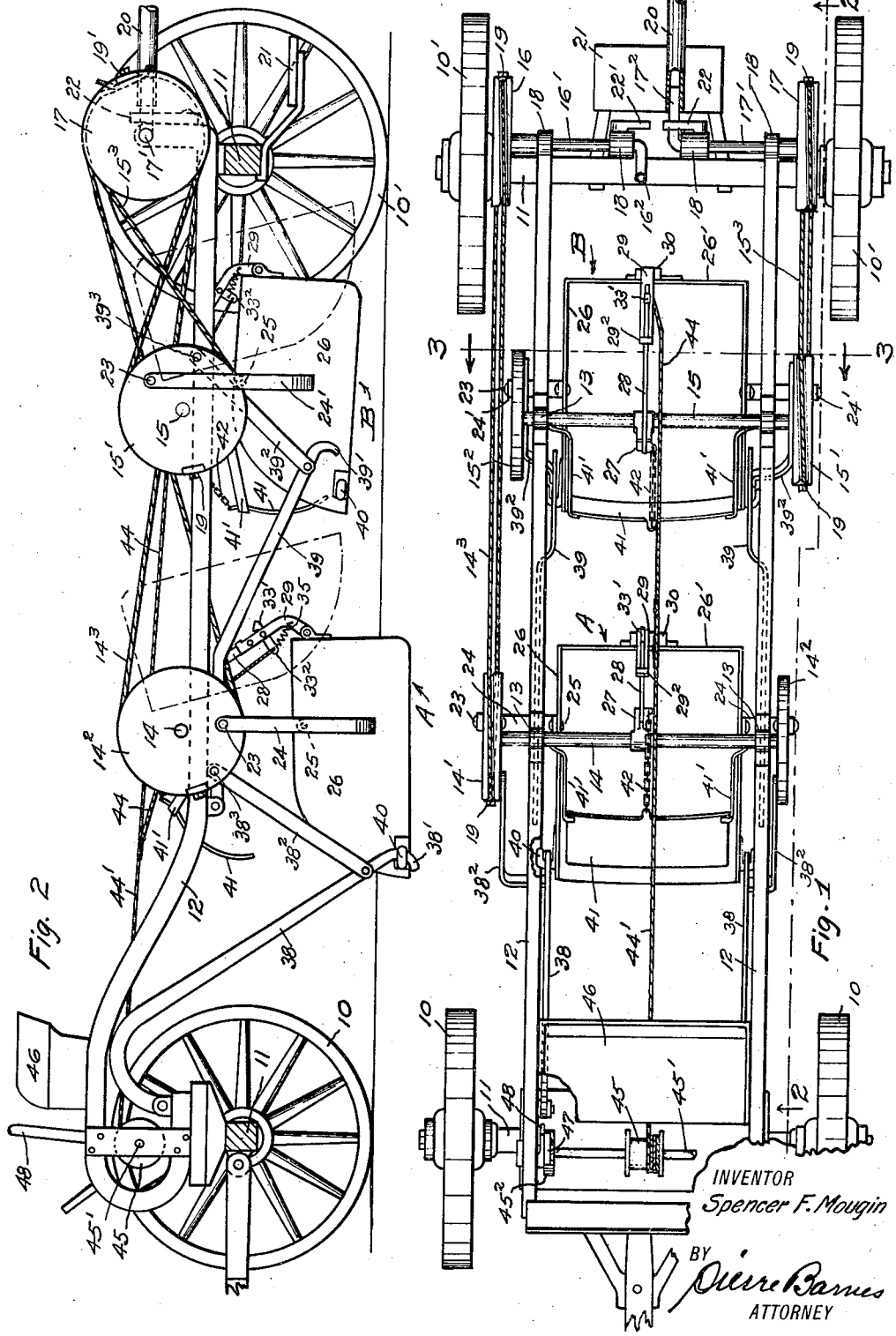

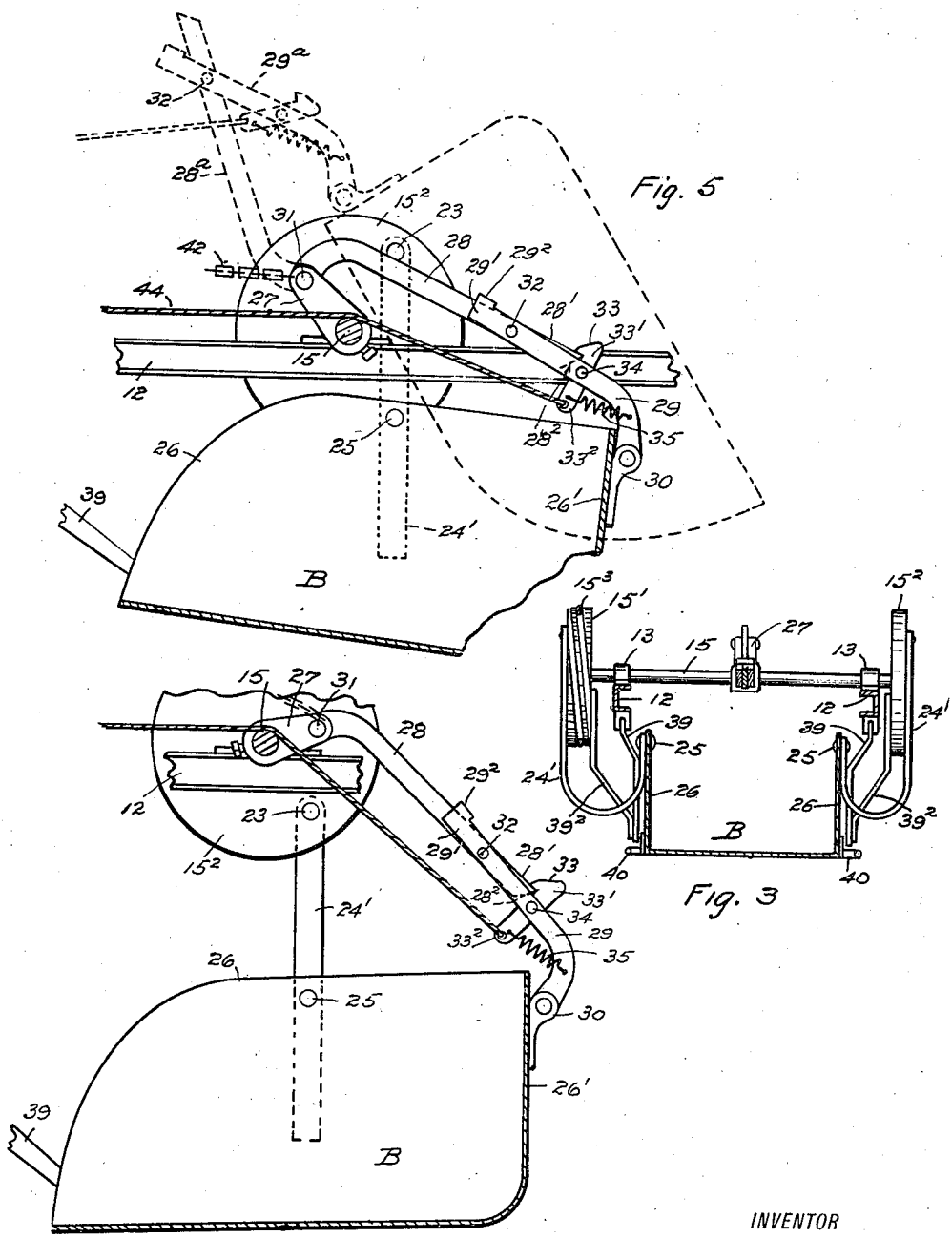

SPENCER F. MOUGIN, OF SEATTLE, WASHINGTON.

WHEELED DIRT-SCRAPER.

1,258,238.  Specification of Letters Patent.  Patented Mar. 5, 1918.

Application filed January 28, 1916. Serial No. 74,747.

*To all whom it may concern:*

Be it known that I, SPENCER F. MOUGIN, a citizen of the United States, residing at Seattle, in the county of King and State of Washington, have invented certain new and useful Improvements in Wheeled Dirt-Scrapers, of which the following is a specification.

This invention relates to wheeled dirt scrapers which are employed in excavating and grading earth, sand, gravel, etc., and then transporting such material to a fill or dump. The object is to provide a conveniently operated scraper of this character having a large carrying capacity to enable the work to be rapidly and economically performed.

With these ends in view, the invention consists in the novel construction, adaptation and combination of parts, as will be hereinafter described and claimed.

In the accompanying drawings, Figure 1 is a plan view of a wheeled scraper embodying my improvements. Fig. 2 is a longitudinal vertical section taken substantially through 2—2 of Fig. 1. Fig. 3 is a transverse vertical section through 3—3 of Fig. 1. Fig. 4 is a detail longitudinal sectional view of a scoop and the controlling mechanism therefor when in the loading position. Fig. 5 is a similar view, showing by full lines a scoop in load-carrying position and by broken lines the position it will assume in dumping.

The reference numerals 10 and $10^1$ designate front and rear wheels, and 11 are the axles therefor of a vehicle having a body including longitudinal side members 12. Secured to said frame members are the journal boxes 13 for transverse shafts 14 and 15 arranged one in advance of the other.

Fixedly mounted on the opposite ends of said shafts are wheels or disks $14^1$, $14^2$, $15^1$ and $15^2$. The disks $14^1$ and $15^1$ are provided with peripheral grooves to serve as sheaves for crossed belts or endless cables $14^3$ and $15^3$ which respectively extend about peripherally grooved sheaves 16 and 17 provided on transverse stub shafts $16^1$ and $17^1$ journaled in bearing boxes 18 secured to the rear axle or the vehicle frame. Said cables are secured to the several sheaves by clamps, as indicated by 19, or other suitable means, so that when either of the sheaves associated with a cable is rotated, the other sheave will likewise be rotated. To effect such turning of the sheaves for elevating a load, as will be presently explained, I provide upon said stub shafts arms $16^2$ and $17^2$ rectangular
thereof to be successively engaged in a tubular handle 20 which is operable by an attendant standing on a platform 21 depending from the rear axle.

22 and $22^1$ represent hooks engageable over the shaft arms $16^2$ and $17^2$ to secure the same in their turned-down positions. The disks for the shafts 14 and 15 are provided with crank pins 23 whereto are connected the upper ends of hanger-elements 24 and $24^1$ which are formed to substantially U-shapes (Fig. 3) and have their other ends connected by pivotal pins 25 to the side walls 26 of scraper pans A and B. Such connections with pans are made adjacent to the upper ends of the referred to walls and at or about their mid-lengths.

Intermediate the lengths of the shafts 14 and 15 are crank-arms 27 arranged in angular relations with respect to radial lines projected through the axes of the respective shafts and the crank pins 23. Each of said crank-arms is connected by links 28 and 29 with an attachment 30 secured to the rear wall $26^1$ of the respective pan.

More particularly, a link 28 is pivotally connected at its forward end by pin 31 to its crank-arm and is coupled by a pin 32 with its complementary link 29. The link 29 is desirably bifurcated to accommodate a part of the link 28 between its bifurcations. The pivotal connection 32 between a pair of links, as best shown in Figs. 4 and 5, is, moreover, disposed at distances from the ends of the links to afford protruding portions $28^1$ and $29^1$. The link portion $28^1$ terminates in a beveled extremity $28^2$ which is adapted, when encountering the beveled face 33 at the upper end of a hook $33^1$ which is swiveled by a pin 34 to link 29, to swerve said hook rearwardly and allow such link extremity to be lowered into position whereupon it is engaged by the hook when the latter is urged forwardly by a spring 35 connected to an extension $33^2$ of said hook.

$29^2$ represents a stop on link 29 and engageable against the link 28 to obviate a pair of links from folding downwardly.

Pivotally connected to the vehicle frame in advance of the respective pans are drawbars 38 and 39 having hook-shaped rear ends 38¹ and 39¹ adapted to engage lugs 40 provided near the front ends of the pans when they are in their loading positions.

The draw-bars are automatically actuated to engage or disengage the same to and from the pans when lowered and raised by connecting the bars by rods 38² and 39² to suitably disposed crank-pins 38³ and 39³ on the respective disks.

41 represent aprons adapted to prevent the loads of the pans from being spilled when being transported. These aprons are each in the nature of a plate of widths less than a pan and are hingedly connected by arms 41¹ to the vehicle frame. The aprons are also connected from their upper ends by chains 42 with the crank-arms 27 of shafts 14 and 15, hence when a crank-arm is swung rearwardly during the lowering of a pan into dirt-scooping position (Fig. 4) the chain serves to raise the connected apron from in front of a pan, as shown, with respect to the forward pan A in Figs. 1 and 2.

In elevating a pan, as indicated in Fig. 5, said crank-arm is swung forwardly, resulting in the lowering of the apron with respect to its pan, as illustrated for the rearmost pan in Figs. 1 and 2.

The aforesaid hook extensions 33² are connected to branches 44 of a cable or rope 44¹ which is led to and about a winding drum 45 provided on a shaft 45¹ adjacent to the driver's seat 46. Said shaft is also provided with a ratchet wheel 45² whereby rotary motion may be imparted to said drum for winding the rope 44¹ thereabout through the medium of a pawl 47 carried by a lever 48 which is loosely pivoted on the shaft 45¹.

The invention is illustrated as applied to a vehicle designed to be drawn by a team of horses, but it may, if desired, be propelled by an engine or by any other suitable means.

The operation of the invention is as follows:

The pans A and B are, by the power of gravity, successively lowered into filling positions when the hooks 22 and 22¹ are disengaged from the arms 17² and 16² by an attendant who rides on the vehicle platform 21.

After the pans are loaded, they are successively elevated by the attendant and thus maintained until the vehicle reaches the dumping place, when the driver from his seat 46 effects the simultaneous tilting of both pans to deposit their contents.

Referring particularly to Figs. 4 and 5, a pan, as B in the example, is lowered by its weight acting through hangers 24¹ and rotating of the disks to present the pan in the position in which represented in Fig. 4. As this occurs, the pair of links 28 and 29 are distended and thus locked through the office of the spring actuated hook 33¹. Also as the pan descends, the rods 38² shown with respect to pan A in Fig. 2, are affected by the rotation of disks 14¹ and 14² to cause the hooked ends 38¹ of draw-bars 38 to engage lugs 40 of the pan to accordingly secure the pan against relative rearward movement in the progress of the vehicle.

After being loaded, a pan is raised by the attendant at the rear who imparts, as explained, rotary motion to the disks 14¹ and 14² which act through the medium of the hangers to raise the pan. As this occurs, the pair of links 28 and 29 remain distended, and, subject to the changed position of crank 27, coöperate with the hangers to raise the pan into the position shown in Fig. 5.

Meanwhile the rods 39² are influenced by the rotation of the disks with which they are connected to disengage the draw-bars 39 from the pan. Furthermore, while a pan is being raised the crank-arm 27 to which chain 42 of the associated apron 41 is connected, is tilted forwardly to thereby allow the apron to descend into operative position in front of the load in the pan to prevent the accidental spilling of the same.

Such a position of an apron is indicated in Fig. 2 with respect to the pan B. When both pans are thus elevated in loaded states, the vehicle is propelled to the dumping place, whereat the driver by winding the rope 44¹ about drum 45 through instrumentality of the lever 48, exercises a pull through rope branches 44 to first disengage the hooks 33¹ from the links 28 of both pans and by a continued pull the rear ends of both pans are tilted up into dumping positions such as indicated by broken lines B¹ in Fig. 5. As this occurs, the links 28 and 29 assume the relative positions such as denoted by broken lines 28ª and 29ª in the view.

What I claim, is—

1. In a wheeled dirt-scraper, a vehicle frame, a transverse shaft rotatably mounted on said frame, crank elements provided at the extremities of said shaft, a crank arm provided on said shaft intermediate the ends thereof, a pan, hangers depending from said crank elements, pivots connecting said hangers to the pan for supporting the same, a jointed pair of links connecting the rear end of the pan with said crank-arm, a device carried by one of the links and detachably engaging the other link to retain the links in positions to hold the pan in substantially horizontal positions at its various elevations as effected through the instrumentality of said shaft and the crank elements thereof, and means for actuating said device whereby the links are first rendered inoperative to hold the pan in a substantially horizontal position and subsequently serving to influence the links whereby the pan is tilted about the axis of said pivots.

2. In a wheeled scraper, a vehicle frame, a transverse shaft thereon, two crank-disks secured on said shaft, a pan, hangers connected to said crank-disks and to the pan for tiltably supporting the same at various elevations, a second shaft, a wheel mounted on this shaft, operative connections between said wheel and one of said disks whereby a rotary movement of said second shaft will impart rotary movement to the first-named shaft to raise or lower the pan through the medium of said hangers, means to rotate said second shaft, means to secure the shaft in adjusted rotated position, devices connected with said first-named shaft and the pan for releasably holding said pan against accidental tilting, and a locking means co-operating with said devices to render the same operative, and means whereby said locking means are rendered temporarily inoperative and the tilting of the pan is accomplished.

3. In a wheeled dirt-scraper, a transverse shaft, disks mounted thereon, crank pins provided on said disks, a pan, hangers connected to said pan and to said crank-pins, draw-bars engageable with the forward end of said pan, operative connections between said draw-bars and the disks whereby the rotary movements of the latter in lowering and raising the pan will respectively engage and disengage the draw-bar with respect to the pan, operative connections between said shaft and the rear end of the pan for holding the rear end of the latter in its loading and carrying positions, and means operable from the front end of the scraper whereby said connections are rendered temporarily inoperative and the dumping of the pan is effected.

Signed at Seattle, Washington, this 8th day of January, 1916.

SPENCER F. MOUGIN.

Witnesses:
PIERRE BARNES,
E. PETERSON.